US012658366B2

(12) United States Patent
Nakamura

(10) Patent No.: US 12,658,366 B2
(45) Date of Patent: Jun. 16, 2026

(54) CAPACITOR MODULE HAVING A BUS BAR WITH A PORTION THEREOF IN A SEALING RESIN

(71) Applicant: Murata Manufacturing Co., Ltd., Nagaokakyo (JP)

(72) Inventor: Hiroaki Nakamura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 180 days.

(21) Appl. No.: 18/240,654

(22) Filed: Aug. 31, 2023

(65) Prior Publication Data

US 2023/0411079 A1     Dec. 21, 2023

Related U.S. Application Data

(63) Continuation of application No. PCT/JP2022/003095, filed on Jan. 27, 2022.

(30) Foreign Application Priority Data

Mar. 2, 2021     (JP) ................................. 2021-032901

(51) Int. Cl.
*H01G 2/10*          (2006.01)
*H01G 2/04*          (2006.01)
(Continued)

(52) U.S. Cl.
CPC .............. *H01G 2/106* (2013.01); *H01G 2/04* (2013.01); *H01G 2/10* (2013.01); *H01G 4/228* (2013.01); *H01G 4/38* (2013.01)

(58) Field of Classification Search
None
See application file for complete search history.

(56) References Cited

U.S. PATENT DOCUMENTS 10,964,480 B2     3/2021  Kanda et al.
2006/0104006 A1 *  5/2006  Saito ...................... H01G 4/224
                                                                 361/301.3
(Continued)

FOREIGN PATENT DOCUMENTS

CN        110111998 A  *  8/2019  ............. H01G 4/224
JP        S61-001042 A     1/1986
(Continued)

OTHER PUBLICATIONS

Translation WO 2020031676A—(No date).*
International Search Report in PCT/JP2022/003095, mailed Apr. 12, 2022, 4 pages.

*Primary Examiner* — Eric W Thomas
(74) *Attorney, Agent, or Firm* — ArentFox Schiff LLP

(57) ABSTRACT

A capacitor module that includes: a case defining an interior space; a sealing resin in the interior space; one or more capacitors in the sealing resin; a first bus bar and a second bus bar each having a contact portion that is in contact with an electrode of the one or more capacitors, a buried portion in the sealing resin and extending from the contact portion, and an exposed portion that extends from the first buried portion outside the sealing resin, wherein at least one of the first contact portion, the second contact portion, the first buried portion, and the second buried portion define one or more through holes that are filled with the sealing resin or include one or more protrusions surrounded by the sealing resin.

12 Claims, 16 Drawing Sheets

(51) Int. Cl.
 *H01G 4/228* (2006.01)
 *H01G 4/38* (2006.01)

(56) References Cited

U.S. PATENT DOCUMENTS

| | | | | |
|---|---|---|---|---|
| 2007/0109715 | A1 * | 5/2007 | Azuma | B60K 6/28 |
| | | | | 361/299.3 |
| 2009/0059467 | A1 * | 3/2009 | Grimm | H01G 9/10 |
| | | | | 361/301.5 |
| 2018/0108495 | A1 | 4/2018 | Nishishita et al. | |
| 2018/0342354 | A1 | 11/2018 | Imamura et al. | |
| 2019/0080850 | A1 | 3/2019 | Inazumi | |
| 2019/0198246 | A1 | 6/2019 | Kanda et al. | |

FOREIGN PATENT DOCUMENTS

| | | | | | |
|---|---|---|---|---|---|
| JP | H03085622 | U | * | 8/1991 | |
| JP | 2005085880 | A | | 3/2005 | |
| JP | 2009-194080 | A | | 8/2009 | |
| JP | 2013089654 | A | * | 5/2013 | |
| JP | 2014116446 | A | | 6/2014 | |
| JP | 2016-092086 | A | | 5/2016 | |
| JP | 2018037433 | A | | 3/2018 | |
| JP | 2018064051 | A | | 4/2018 | |
| JP | 2019096713 | A | | 6/2019 | |
| JP | 2019-117886 | A | | 7/2019 | |
| WO | 2017146013 | A1 | | 8/2017 | |
| WO | 2017204065 | A1 | | 11/2017 | |
| WO | WO-2020031676 | A1 | * | 2/2020 | H01G 4/228 |

* cited by examiner

51

51b

51a

1

36   31

32

13

61

35a 13b
14b
12a
13a
14a 12
11b
12b
11a
11

14

35

35

15    16    17    18

15b   40   16a   35   17b   40

15a   40   16b   35   17a   40   18b   18a

Y

X ⊗ Z

1

31    36

37

12

61

40a 12b
11b
13a
12a
11a 13
14b
13b
11a
14

35

35

11

18

18a    40    17b    35    16a    40    15b    15a 18b    40    17a    35    16b    40

17    16    15

3

233

231

212

251b

232

211

251

211a

241

232

242

212a

242

251a

241

CAPACITOR MODULE HAVING A BUS BAR WITH A PORTION THEREOF IN A SEALING RESIN

CROSS REFERENCE TO RELATED APPLICATIONS

The present application is a continuation of International application No. PCT/JP2022/003095, filed Jan. 27, 2022, which claims priority to Japanese Patent Application No. 2021-032901, filed Mar. 2, 2021, the entire contents of each of which are incorporated herein by reference.

TECHNICAL FIELD

The present invention relates to a capacitor module.

BACKGROUND ART

A capacitor module in which a capacitor is housed in a case and filled with a sealing resin is known. In such a capacitor module, electrodes at both ends of each capacitor are connected to a bus bar.

Patent Document 1 discloses a capacitor module in which a part of a bus bar is exposed to the outside of a sealing resin in order to accelerate heat dissipation of the capacitor module.

Patent Document 1: JP-A-2019-96713

SUMMARY OF THE INVENTION

In the capacitor module disclosed in Patent Document 1, there is a problem that the bus bar moves in the sealing resin due to a thermal shock, a vibration, or the like, and thus connection failure occurs.

Therefore, an object of the present invention is to provide a capacitor module with improved connection reliability of a bus bar.

According to an aspect of the present invention, a capacitor module includes a case defining an interior space and having an opening at a position opposed to a bottom surface thereof; a sealing resin in the interior space of the case; one or more capacitors in the sealing resin in the interior space of the case, each of the one or more capacitors having a first electrode and a second electrode; a first bus bar having a first contact portion that is in contact with the first electrode of the one or more capacitors, a first buried portion in the sealing resin and extending from the first contact portion, and a first exposed portion that extends from the first buried portion outside the sealing resin; and a second bus bar having a second contact portion that is in contact with the second electrode of the one or more capacitors, a second buried portion in the sealing resin and extending from the second contact portion, and a second exposed portion that extends from the second buried portion outside the sealing resin, wherein at least one of the first contact portion, the second contact portion, the first buried portion, and the second buried portion define one or more through holes that are filled with the sealing resin or include one or more protrusions surrounded by the sealing resin.

According to the present invention, it is possible to provide a capacitor module with improved connection reliability of a bus bar.

DETAILED DESCRIPTION OF THE PREFERRED EMBODIMENTS

Circumstances Leading To Present Invention

Figure 1:
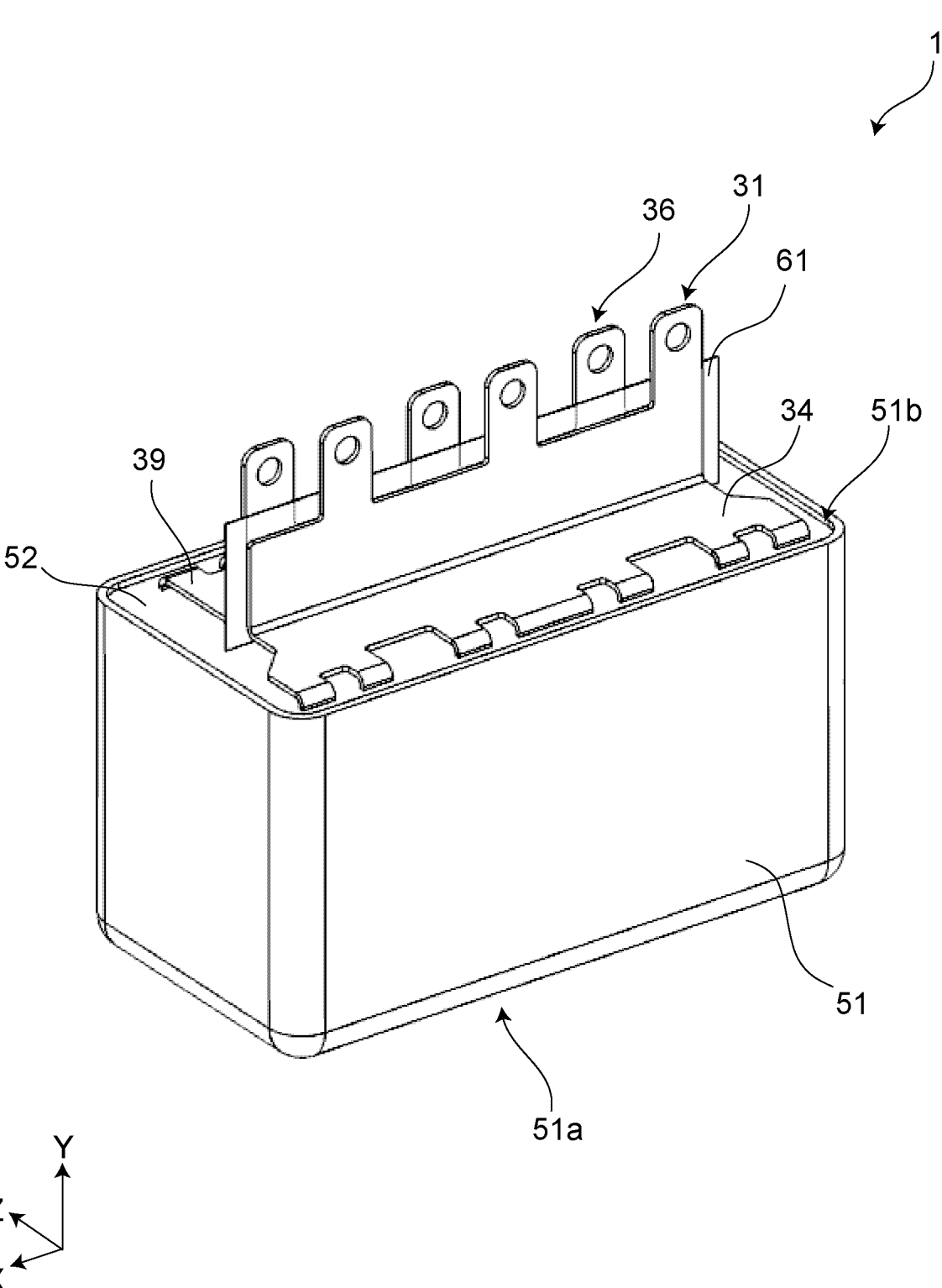
FIG. 1 is a perspective view of a capacitor module according to a first embodiment of the present invention.

In a capacitor module in which a capacitor is housed in a case and filled with a sealing resin, electrodes at both ends of each capacitor are connected to bus bars. Since a capacitor module generates heat when a capacitor is energized, a capacitor module having a configuration in which a part of a bus bar is exposed to the outside of a sealing resin for the purpose of heat dissipation is known.

For example, in the capacitor module disclosed in Patent Document 1, a part of the bus bar is buried in the sealing resin. Thus, when stress is applied to the sealing resin and the bus bar due to a thermal shock, a vibration, or the like, the bus bar may be separated from the sealing resin, connection with the capacitor may fail, or a problem in the capacitor module may be caused.

Therefore, the present inventors have studied a configuration of a capacitor module with improved connection reliability of a bus bar, and have reached the following invention.

According to an aspect of the present invention, a capacitor module includes a case defining an interior space and having an opening at a position opposed to a bottom surface thereof; a sealing resin in the interior space of the case; one or more capacitors in the sealing resin in the interior space of the case, each of the one or more capacitors having a first electrode and a second electrode; a first bus bar having a first contact portion that is in contact with the first electrode of the one or more capacitors, a first buried portion in the sealing resin and extending from the first contact portion, and a first exposed portion that extends from the first buried portion outside the sealing resin; and a second bus bar having a second contact portion that is in contact with the second electrode of the one or more capacitors, a second buried portion in the sealing resin and extending from the second contact portion, and a second exposed portion that extends from the second buried portion outside the sealing resin, wherein at least one of the first contact portion, the second contact portion, the first buried portion, and the second buried portion define one or more through holes that are filled with the sealing resin or include one or more protrusions surrounded by the sealing resin.

According to this configuration, it is possible to prevent an occurrence of a situation in which the bus bar is separated from the sealing resin, and it is possible to improve the connection reliability of the bus bar.

The contact portion and/or the buried portion may include the one or more through holes.

According to this configuration, the periphery of the one or more through holes are surrounded by the sealing resin. Thus, it is possible to suppress the movement of the bus bar with respect to a direction perpendicular to a penetration direction of the through hole, and it is possible to improve the connection reliability of the bus bar.

The contact portion and/or the buried portion having the one or more through holes may extend in a direction from the bottom surface of the case toward the opening.

According to this configuration, since the through hole is formed in a direction parallel to an opening surface of the case, it is possible to suppress the movement of the bus bar from the bottom surface to the opening.

The contact portion and/or the buried portion may include the one or more protrusions.

According to this configuration, since the periphery of the one or more protrusions are surrounded by the sealing resin, it is possible to suppress the movement of the bus bar with respect to the direction perpendicular to an extension direction of the protrusion, and it is possible to improve the connection reliability of the bus bar.

The one or more protrusions may include a first protrusion formed by bending an end portion of the contact portion and/or the buried portion.

According to this configuration, since the first protrusion is surrounded by the resin, it is possible to suppress the movement of the bus bar with respect to the direction perpendicular to an extension direction of the protrusion, and it is possible to improve the connection reliability of the bus bar.

The one or more protrusions may include a second protrusion formed by stretching a part of the contact portion and/or the buried portion in a width direction.

According to this configuration, since the second protrusion can be formed in a plurality of directions, it is possible to further reduce the occurrence of separation of the bus bar from the sealing resin.

Each of the plurality of capacitors may have a corresponding through hole of the one or more through holes or have a corresponding protrusion of the one or more protrusions.

According to this configuration, it is possible to contribute to size reduction of the capacitor module and to realize low ESR.

First Embodiment

Figure 2A:
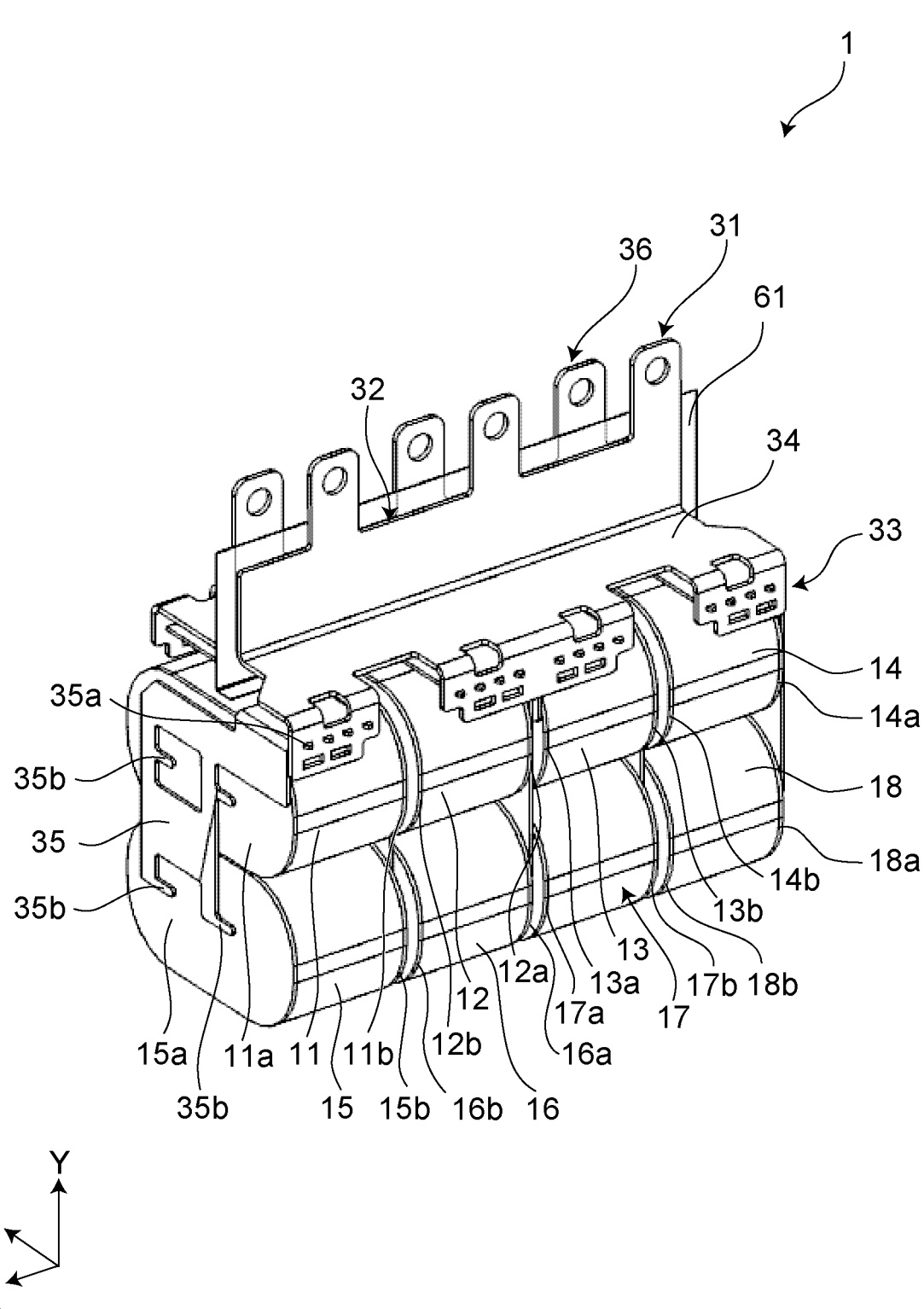
FIG. 2A is a perspective view of the capacitor module in FIG. 1 in which a case and a sealing resin are omitted.
Figure 2B:
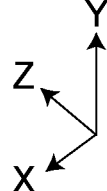
FIG. 2B is a perspective view showing the case of the capacitor module in FIG. 1.
Figure 2C:
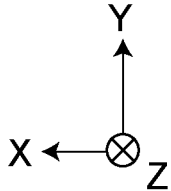
FIG. 2C is a side view of the capacitor module in FIG. 2A.
Figure 2D:
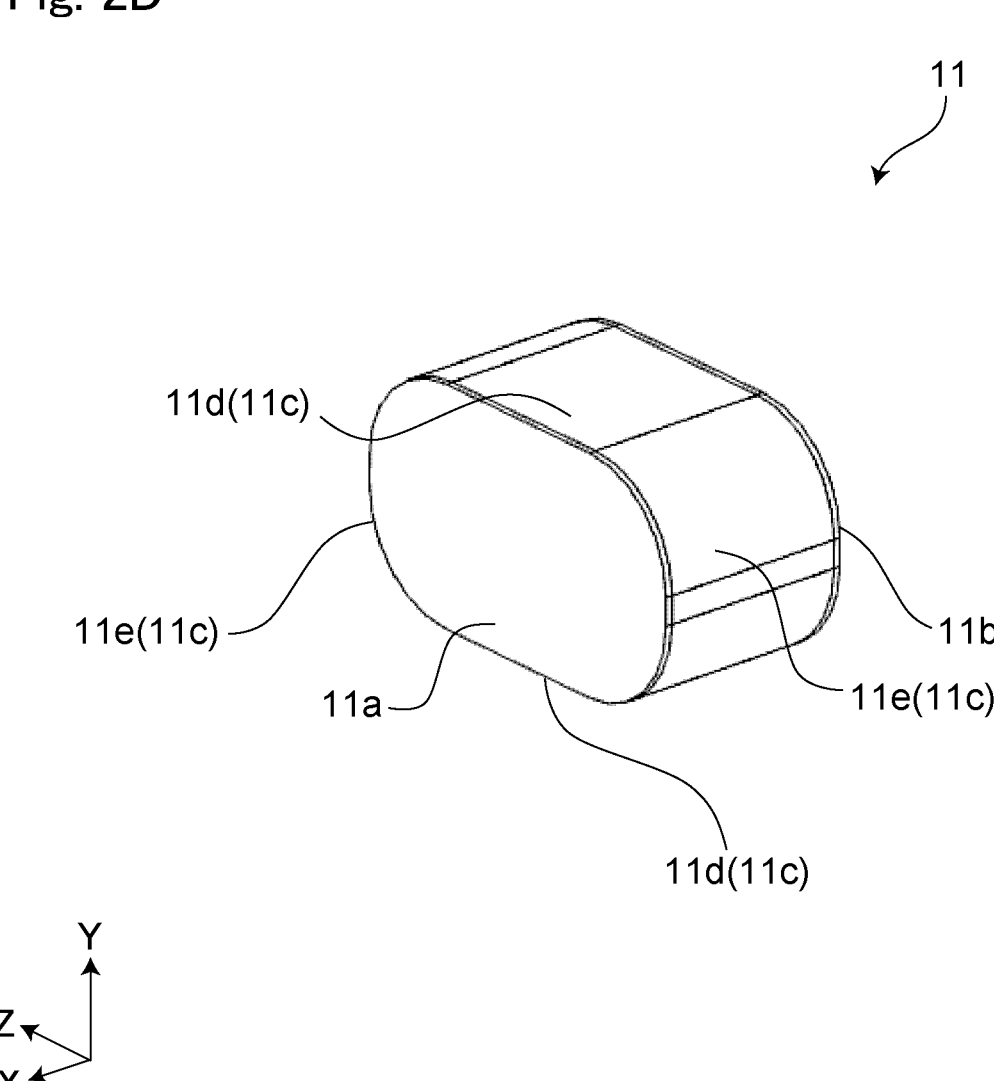
FIG. 2D is a perspective view showing a capacitor included in the capacitor module in FIG. 1.
Figure 3:
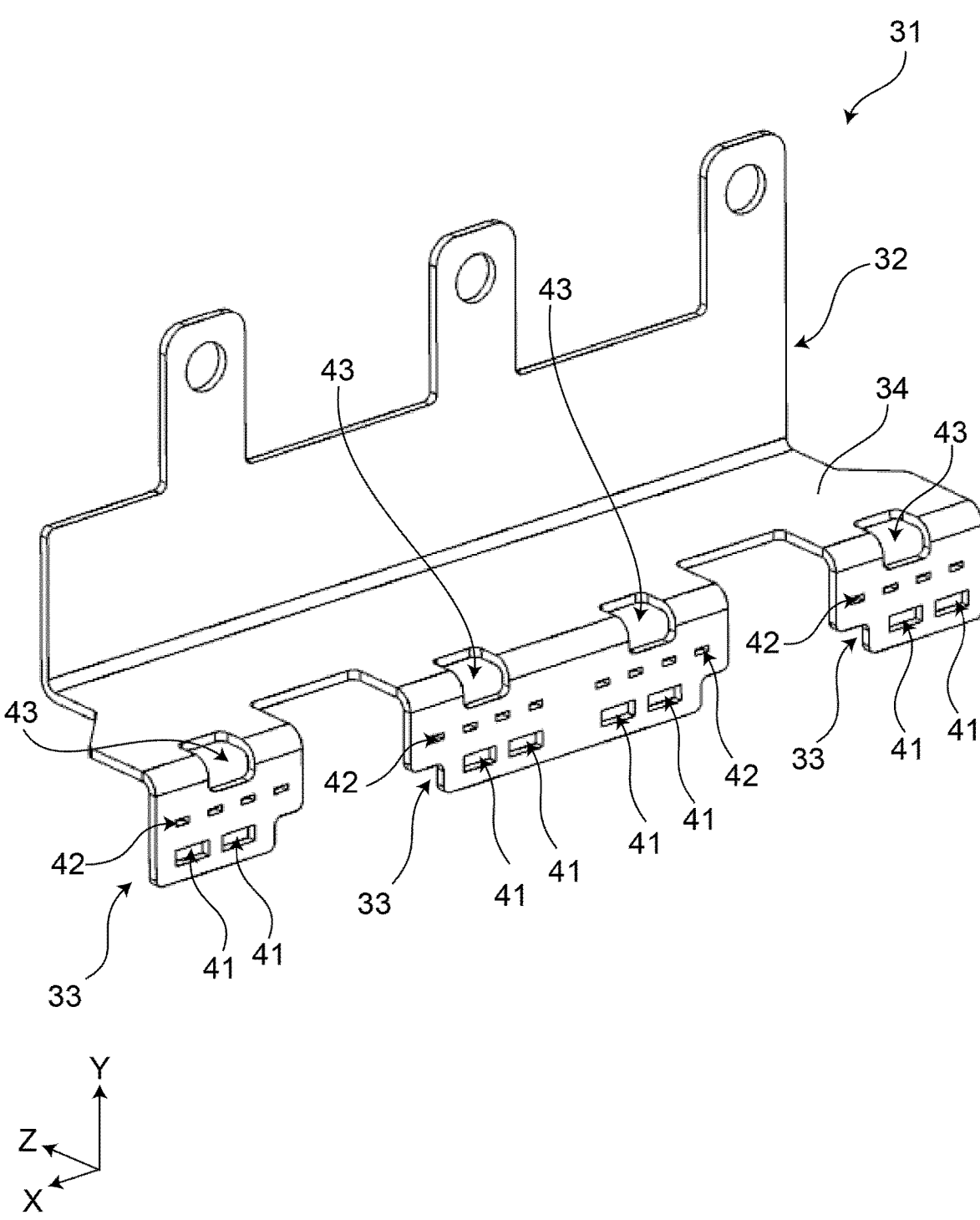
FIG. 3 is a perspective view showing a body portion of a first bus bar of the capacitor module in FIGS. 2A and 2C.
Figure 4A:
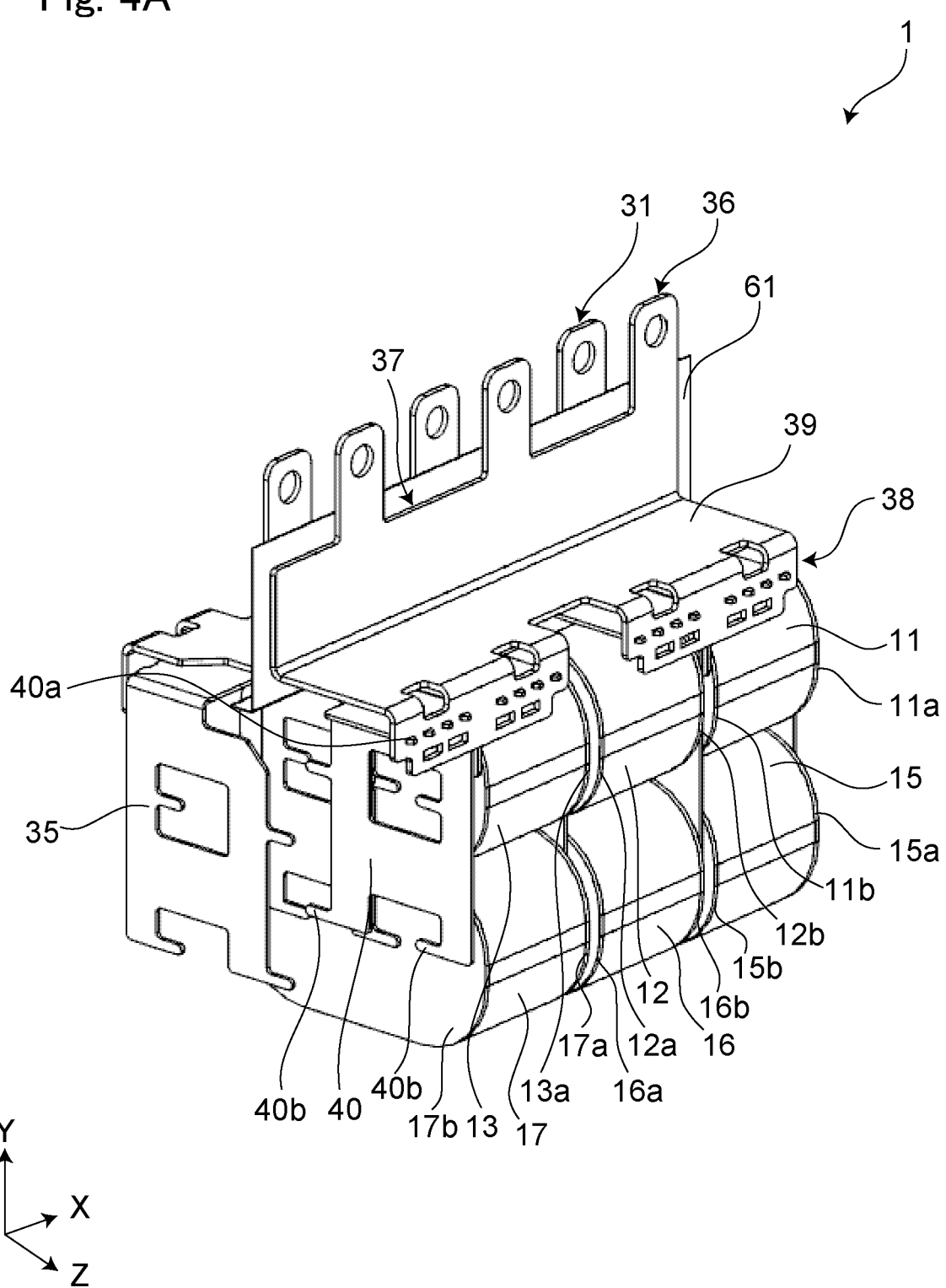
FIG. 4A is a perspective view of the capacitor module in FIG. 2A when viewed from another direction.
Figure 4B:
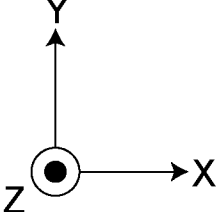
FIG. 4B is a side view of the capacitor module in FIG. 4A.
Figure 5:
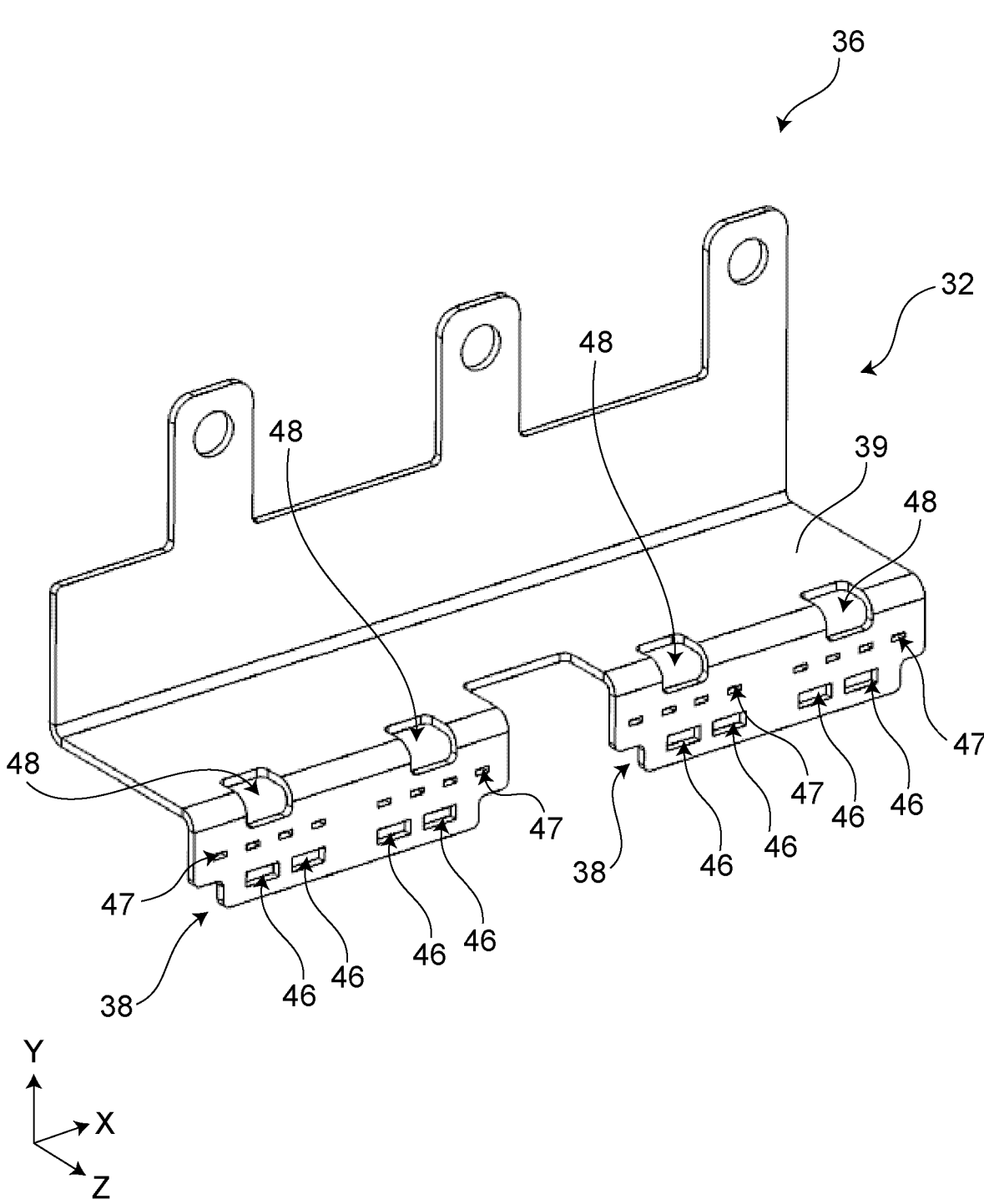
FIG. 5 is a perspective view showing a body portion of a second bus bar of the capacitor module in FIGS. 4A and 4B.

FIG. 1 is a perspective view of a capacitor module 1 according to a first embodiment of the present invention. FIG. 2A is a perspective view of the capacitor module 1 in FIG. 1 in which a case 51 and a sealing resin 52 are omitted. FIG. 2B is a perspective view showing the case 51 of the capacitor module 1 in FIG. 1. FIG. 2C is a side view of the capacitor module 1 in FIG. 2A. FIG. 2D is a perspective view showing a capacitor 11 included in the capacitor module 1 in FIG. 1. FIG. 3 is a perspective view showing a body portion 32 of a first bus bar 31 of the capacitor module 1 in FIGS. 2A and 2C. FIG. 4A is a perspective view of the capacitor module 1 in FIG. 2A when viewed from another direction. FIG. 4B is a side view of the capacitor module 1 in FIG. 4A. FIG. 5 is a perspective view showing a body portion 37 of a second bus bar 36 of the capacitor module 1 in FIGS. 4A and 4B. Note that an X-direction, a Y-direction, and a Z-direction in the drawings respectively indicate a lateral direction, a height direction, and a longitudinal direction of the capacitor module 1.

[Overall Configuration]

As shown in FIG. 1 and FIGS. 2A to 2C, a capacitor module 1 includes a case 51, a sealing resin 52, a plurality of capacitors 11 to 18, a first bus bar 31, and a second bus bar 36. In the capacitor module 1, the case 51 houses the capacitors 11 to 18, a part of the first bus bar 31, and a part of the second bus bar 36. The inside of the case 51 is filled with the sealing resin 52.

As shown in FIG. 2B, the case 51 has an opening 51b formed at a position opposed to a bottom surface 51a.

Inside the case 51, eight capacitors 18 are arranged side by side. As shown in FIGS. 2A and 4A, in the present embodiment, the capacitors 11 to 14 are arranged in a row, the capacitors 15 to 18 are arranged in a row, and eight capacitors are arranged in two rows in the Y-direction.

As shown in FIG. 2C, the capacitors 11 to 18 are arranged such that first electrodes 11a to 18a face second electrodes 11b to 18b, respectively.

In the present embodiment, each of the capacitors 11 to 18 is connected to the first bus bar 31 and the second bus bar 36 via a plurality of contact portions 35 and a plurality of contact portions 40.

Specifically, as shown in FIGS. 2C and 4B, the first electrodes 11a to 18a of the respective capacitors 11 to 18 are connected to the first bus bar 31 via the contact portions 35. As illustrated in FIGS. 2C and 4B, the second electrodes 11b to 18b of the respective capacitors 11 to 18 are connected to the second bus bar 36 via the contact portions 40.

<Capacitor>

The capacitors 11 to 18 are a film capacitor. The capacitors 11 to 18 are formed by winding a dielectric film having a metal vapor-deposited film formed on a surface thereof and pressing a wound body of the dielectric film into a flat shape. As shown in FIG. 2A, the respective capacitors 11 to 18 include the first electrodes 11a to 18a and the second electrodes 11b to 18b.

As shown in FIG. 2C, the capacitors 11 to 18 are disposed such that the first electrodes 11a to 18a face the second electrodes 11b to 18b, respectively. Specifically, the second electrode 11b faces the second electrode 12b, The second electrode 13b faces the second electrode 14b. The second electrode 15b faces the second electrode 16b. The second electrode 17b faces the second electrode 18b. Furthermore, the first electrode 12a faces the first electrode 13a, and the first electrode 16a faces the first electrode 17a.

As shown in FIG. 2D, the capacitor 11 has a side surface 11c that connects the first electrode 11a and the second electrode 11b to each other. The side surface 11c includes a pair of flat portions 11d and a pair of curved portions 11e obtained by connecting the pair of flat portions 11d to each other. This configuration is similar in the capacitors 12 to 18. The capacitors 11 to 18 are disposed such that the pair of flat portions 11d face the bottom surface 51a and the opening 51b of the case 51, respectively.

As the dielectric film of the capacitors 11 to 18, for example, a plastic film such as polyethylene terephthalate, polypropylene, polyphenylene sulfide, or polyethylene naphthalate can be used. As the metal vapor-deposited film formed on the surface of the plastic film, Al, Zn, or the like can be used. The first electrodes 11*a* to 18*a* and the second electrodes 11*b* to 18*b* are formed on the end portion of the wound dielectric film by, for example, spraying Zn or the like.

<First Bus Bar>

As shown in FIGS. 2A and 3, the first bus bar 31 is a conductive member that has a plate shape and is connected to the first electrodes 11*a* to 18*a* of the capacitors 11 to 18. In the present embodiment, the first bus bar 31 includes a body portion 32 and a contact portion 35. The body portion 32 includes a buried portion 33 disposed inside the sealing resin 52 and an exposed portion 34 that extends from the buried portion 33 and is disposed outside the sealing resin 52.

A plurality of the contact portions 35 are disposed inside the sealing resin 52, and the contact portions 35 are in contact with the first electrodes 11*a* to 18*a*, respectively. More specifically, one contact portion 35 is in contact with the first electrode 11*a* and the first electrode 15*a*. Similarly, another contact portion 35 is in contact with the first electrode 12*a* and the first electrode 16*a*, still another contact portion 35 is in contact with the first electrode 13*a* and the first electrode 17*a*, and still yet another contact portion 35 is in contact with the first electrode 14*a* and the first electrode 18*a*. That is, in the present embodiment, the four contact portions 35 are in contact with the first electrodes 11*a* to 18*a* of the two capacitors 11 to 18, respectively.

The contact portion 35 includes a claw 35*a* (see FIGS. 2A and 2C) for connection with the buried portion 33 described later, and a claw 35*b* (see FIG. 2A) for connection with each of the first electrodes 11*a* to 18*a*.

The buried portion 33 is a portion that is buried in the sealing resin 52 when housed in the case 51. In the present embodiment, as shown in FIG. 3, three buried portions 33 are formed in the body portion 32. As shown in FIG. 3, a through hole 41 and a connection portion 42 are formed in each of the buried portions 33.

Since the inside and the periphery of the through hole 41 are surrounded by the sealing resin 52, it is possible to prevent separation of the body portion 32 (first bus bar 31) from the sealing resin 52. By providing the through hole 41 in the buried portions 33, it is possible to suppress the movement and positional displacement of the first bus bar 31 when a load such as a thermal shock or a vibration is applied to the capacitor module 1. Therefore, it is possible to more accurately maintain the contact state between the first bus bar 31 and the first electrodes 11*a* to 18*a* of the capacitors 11 to 18, and it is possible to improve the connection reliability of the first bus bar 31.

In the present embodiment, as shown in FIG. 3, the buried portion 33 is formed to extend from the exposed portion 34 in a direction (−Y direction) toward the bottom surface 51*a* from the opening 51*b* of the case 51. Therefore, the through hole 41 is formed in a direction (Z-direction) perpendicular to the −Y-direction. By filling the inside and the periphery of the through hole 41 formed in the Z-direction with the sealing resin 52, it is possible to suppress the movement of the first bus bar 31 in the Y-direction perpendicular to the Z-direction.

As shown in FIG. 3, the connection portion 42 is formed in the buried portion 33. Similarly to the through hole 41, the connection portion 42 is a hole formed in the buried portion

33. By inserting the claw 35*a* (see FIGS. 2A and 2C) formed in the contact portion 35 into the connection portion 42 and soldering the periphery of the connection portion 42, the body portion 32 and the contact portion 35 are electrically connected to each other. Thus, the first electrodes 11*a* to 18*a* of the respective capacitors 11 to 18 are electrically connected to the body portion 32 via the contact portions 35. Alternatively, the buried portion 33 and the contact portion 35 may be connected by welding.

In the present embodiment, a plurality of contact portions 35 are shown, but the shape and number of contact portions are not particularly limited as long as the first electrodes 11*a* to 18*a* of the capacitors can be electrically connected with the body portion 32.

The exposed portion 34 is a portion that extends from the buried portion 33 of the first bus bar 31 and is disposed outside the sealing resin 52. As shown in FIG. 1, the exposed portion 34 is disposed along the opening 51*b* of the case 51. By disposing the exposed portion 34 in this manner, for example, a cooling member such as a thermal pad can be disposed on the exposed portion 34 to improve heat dissipation performance of the capacitor module 1.

In addition, when the contact portion 35 and the buried portion 33 are connected to each other by soldering, it is desirable that the heat capacity of the buried portion 33 be low. In the present embodiment, a plurality of holes 43 are formed near the buried portion 33 in the exposed portion 34 (see FIG. 3). By providing the holes 43, it is possible to reduce the heat capacity of the buried portion 33 and to improve productivity by facilitating connection.

<Second Bus Bar>

As shown in FIGS. 4A and 5, the second bus bar 36 is a conductive member that has a plate shape and is connected to the second electrodes 11*b* to 18*b* of the capacitors 11 to 18. In FIG. 4A, the capacitor 14 and the capacitor 18 are omitted. In the present embodiment, the second bus bar 36 includes a body portion 37 and a contact portion 40. The body portion 37 includes a buried portion 38 disposed inside the sealing resin 52 and an exposed portion 39 that extends from the buried portion 38 and is disposed outside the sealing resin 52.

A plurality of contact portions 40 are disposed inside the sealing resin 52, and the contact portions 40 are in contact with the second electrodes 11*b* to 18*b*, respectively. More specifically, one contact portion 40 is in contact with the second electrode 11*b* and the second electrode 15*b*. Similarly, another contact portion 40 is in contact with the second electrode 12*b* and the second electrode 16*b*. Still another contact portion 40 is in contact with the second electrode 13*b* and the second electrode 17*b*, and still yet another contact portion 40 is in contact with the second electrode 14*b* and the second electrode 18*b*. That is, in the present embodiment, the four contact portions 40 are in contact with the second electrodes 11*b* to 18*b* of the two capacitors 11 to 18, respectively.

The contact portion 40 includes a claw 40*a* for connection with the buried portion 38 described later and a claw 40*b* for connection with each of the second electrodes 11*b* to 18*b*.

The buried portion 38 is a portion that is buried in the sealing resin 52 when housed in the case 51. In the present embodiment, as shown in FIG. 5, two buried portions 38 are formed in the body portion 37. As shown in FIG. 5, a through hole 46 and a connection portion 47 are formed in each of the buried portions 38.

Since the inside and the periphery of the through hole 46 are surrounded by the sealing resin 52, it is possible to prevent separation of the body portion 37 (second bus bar 36) from the sealing resin 52. By providing the through hole 46 in the buried portions 38, it is possible to suppress the movement and positional displacement of the second bus bar 36 when a load such as a thermal shock or a vibration is applied to the capacitor module 1. Therefore, it is possible to more accurately maintain the contact state between the second bus bar 36 and the second electrodes 11b to 18b of the capacitors 11 to 18, and it is possible to improve the connection reliability of the second bus bar 36.

In the present embodiment, as shown in FIG. 5, the buried portion 38 is formed to extend from the exposed portion 39 in the direction (−Y direction) toward the bottom surface 51a from the opening 51b of the case 51. Therefore, the through hole 46 is formed in a direction (Z-direction) perpendicular to the −Y direction. By filling the inside and the periphery of the through hole 46 formed in the Z-direction with the sealing resin 52, it is possible to suppress the movement of the second bus bar 36 in the Y-direction perpendicular to the Z-direction.

As shown in FIG. 5, the connection portion 47 is formed in the buried portion 38. Similarly to the through hole 46, the connection portion 47 is a hole formed in the buried portion 38. By inserting the claw 40a (see FIG. 4B) formed in the contact portion 40 into the connection portion 47 and soldering the periphery of the connection portion 47, the body portion 37 and the contact portion 40 are electrically connected to each other. Thus, the second electrodes 11b to 18b of the respective capacitors are electrically connected to the body portion 37 via the contact portions 40. Alternatively, the buried portion 38 and the contact portion 40 may be connected by welding.

In the present embodiment, a plurality of contact portions 40 are shown, but the shape and number of contact portions are not particularly limited as long as the second electrodes 11b to 18b of the capacitors can be electrically connected with the body portion 37.

The exposed portion 39 is a portion that extends from the buried portion 38 of the second bus bar 36 and is disposed outside the sealing resin 52. As shown in FIG. 1, the exposed portion 39 is disposed along the opening 51b of the case 51. By disposing the exposed portion 39 in this manner, for example, a cooling member such as a thermal pad can be disposed on the exposed portion 39 to improve heat dissipation performance of the capacitor module 1.

In addition, when the contact portion 40 and the buried portion 38 are connected to each other by soldering, it is desirable that the heat capacity of the buried portion 38 be low. In the present embodiment, a plurality of holes 48 are formed near the buried portion 38 in the exposed portion 39. By providing the holes 48, it is possible to reduce the heat capacity of the buried portion 38 and to improve productivity by facilitating connection.

As shown in FIG. 1, parts of the first bus bar 31 and the second bus bar 36 disposed outside the case 51 are insulated by insulating paper 61.

<Case>

The case 51 houses the components of the capacitor module 1. In the present embodiment, as shown in FIG. 2B, the opening 51b is formed at a position opposed to the bottom surface 51a. The case 51 can be formed of a resin such as a synthetic resin. The case 51 can be formed of, for example, a synthetic resin such as polyphenylene sulfide (PPS resin) or polybutylene terephthalate (PBT resin).

<Sealing Resin>

The case 51 is filled with the sealing resin 52 to seal the capacitors 11 to 18, the contact portion 35 and the buried portion 33 of the first bus bar 31, and the contact portion 40 and the buried portion 38 of the second bus bar 36. The sealing resin 52 is a thermosetting resin, and for example, an epoxy resin can be used. Alternatively, a urethane resin or the like may be used.

Effects

According to the capacitor module 1 according to the first embodiment, it is possible to achieve the following effects.

The capacitor module 1 includes the case 51, the sealing resin 52, the plurality of capacitors 11 to 18, the first bus bar 31, and the second bus bar 36. The case 51 has an opening 51b formed at a position opposed to a bottom surface 51a. The case 51 is filled with the sealing resin 52. The capacitors 11 to 18 are housed in the case 51 and disposed inside the sealing resin 52. The first bus bar 31 is connected to one electrodes 11a to 18a of the capacitors 11 to 18. The second bus bar 36 is connected to the other electrodes 11b to 18b of the capacitors 11 to 18. The first bus bar 31 and the second bus bar 36 have the contact portions 35 and 40, the buried portions 33 and 38, and the exposed portions 34 and 39, respectively. The contact portions 35 and 40 are disposed inside the sealing resin 52 and are in contact with the electrodes 11a to 18b of the capacitors 11 to 18. The buried portions 33 and 38 extend from the contact portions 35 and 40 and are disposed inside the sealing resin 52. The exposed portions 34 and 39 extend from the buried portions 33 and 38 and are disposed outside the sealing resin 52. In the first bus bar 31 and the second bus bar 36, the through holes 41 and 46 filled with the sealing resin 52 are provided in the buried portions 33 and 38, respectively.

With such a configuration, it is possible to suppress the separation of the first bus bar 31 and the second bus bar 36 from the sealing resin 52, and it is possible to improve the connection reliability of the first bus bar 31 and the second bus bar 36.

The buried portions 33 and 38 forming the through holes 41 and 46 extend in the direction from the bottom surface 51a of the case 51 toward the opening 51b.

Since the through holes 41 and 46 are formed in the direction parallel to the opening 51b of the case 51, it is possible to suppress the movement of the first bus bar 31 and the second bus bar 36 in the Y-direction. Specifically, since the inside and the periphery of the through hole 41 provided in the Z-direction in the buried portion 33 of the first bus bar 31 are filled with the sealing resin 52, it is possible to suppress the movement of the first bus bar 31 in the direction (Y-direction) perpendicular to the direction in which the through hole 41 is formed. Therefore, when a thermal shock, a vibration, or the like is applied to the capacitor module 1, it is possible to suppress an occurrence of a situation in which the first bus bar 31 is separated from the sealing resin 52. Similarly, since the inside and the periphery of the through hole 46 provided in the Z-direction in the buried portion 38 of the second bus bar 36 are filled with the sealing resin 52, it is possible to suppress the movement of the bus bar in the direction (Y-direction) perpendicular to the direction in which the through hole 46 is formed. Therefore, when a thermal shock, a vibration, or the like is applied to the capacitor module 1, it is possible to suppress an occurrence of a situation in which the second bus bar 36 is separated from the sealing resin 52.

Modification Examples

Although an example in which the capacitor module 1 includes eight capacitors 11 to 18 has been described in the first embodiment, the capacitor module 1 only needs to include one or more capacitors, and the number of capacitors is not limited thereto.

In the first embodiment, an example in which the through holes 41 and 46 are provided in the buried portions 33 and 38 of the first bus bar 31 and the second bus bar 36 has been described, but the present disclosure is not limited thereto. The through hole may be formed in the buried portion of at least one of the first bus bar 31 and the second bus bar 36, depending on the arrangement position of each bus bar and the like.

Figure 6:
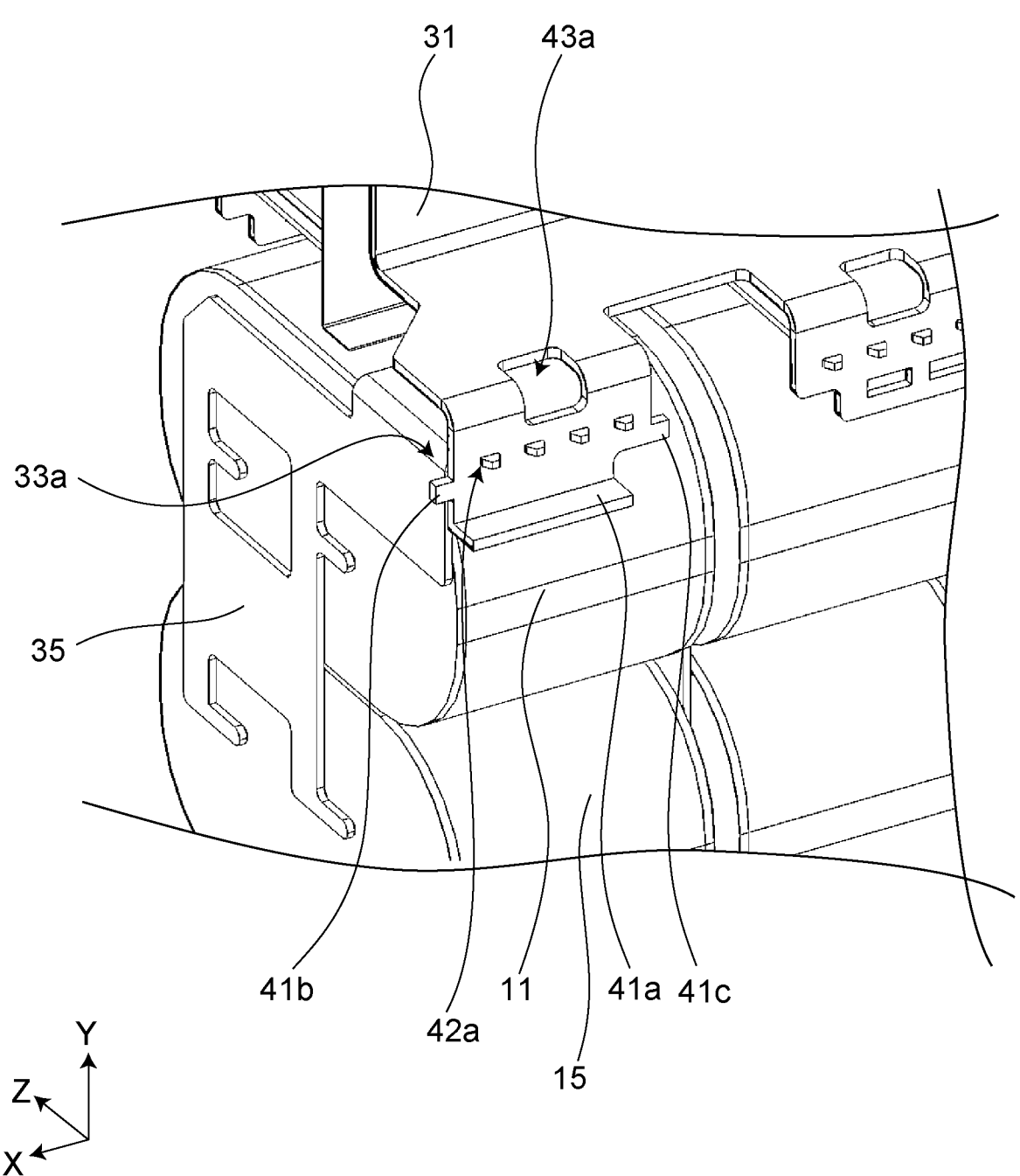
FIG. 6 is a partially enlarged view of a capacitor module according to a modification example of the first embodiment.

In addition, in the first embodiment, an example in which the through holes 41 and 46 are provided in the buried portions 33 and 38 has been described, but the present embodiment is not limited thereto. FIG. 6 is a partially enlarged view of a capacitor module according to the modification example of the first embodiment. As shown in FIG. 6, protrusions 41a, 41b, and 41c may be provided in the buried portion 33a of the first bus bar 31a.

As shown in FIG. 6, a first protrusion 41a is formed in the buried portion 33a by bending the end portion of the buried portion 33. By forming the first protrusion 41a, the periphery of the first protrusion 41a is surrounded by the sealing resin 52, and thus it is possible to suppress the movement of the first bus bar 31a inside the sealing resin 52.

In addition, as shown in FIG. 6, in the buried portion 33a, second protrusions 41b and 41c are formed by extending a part of the buried portion 33a in the width direction. Since the second protrusion can be formed in a plurality of directions with respect to the respective buried portions 33a, it is possible to further reduce the separation of the first bus bar 31a from the sealing resin 52.

The first protrusion and/or the second protrusion may also be formed in the second bus bar 36 instead of the through hole 46.

Second Embodiment

A capacitor module 2 according to a second embodiment of the present invention will be described.

In the second embodiment, points different from the first embodiment will be mainly described. In the second embodiment, the same or equivalent components as those of the first embodiment will be described with the same reference signs. In the second embodiment, the description overlapping with the first embodiment will be omitted.

Figure 7A:
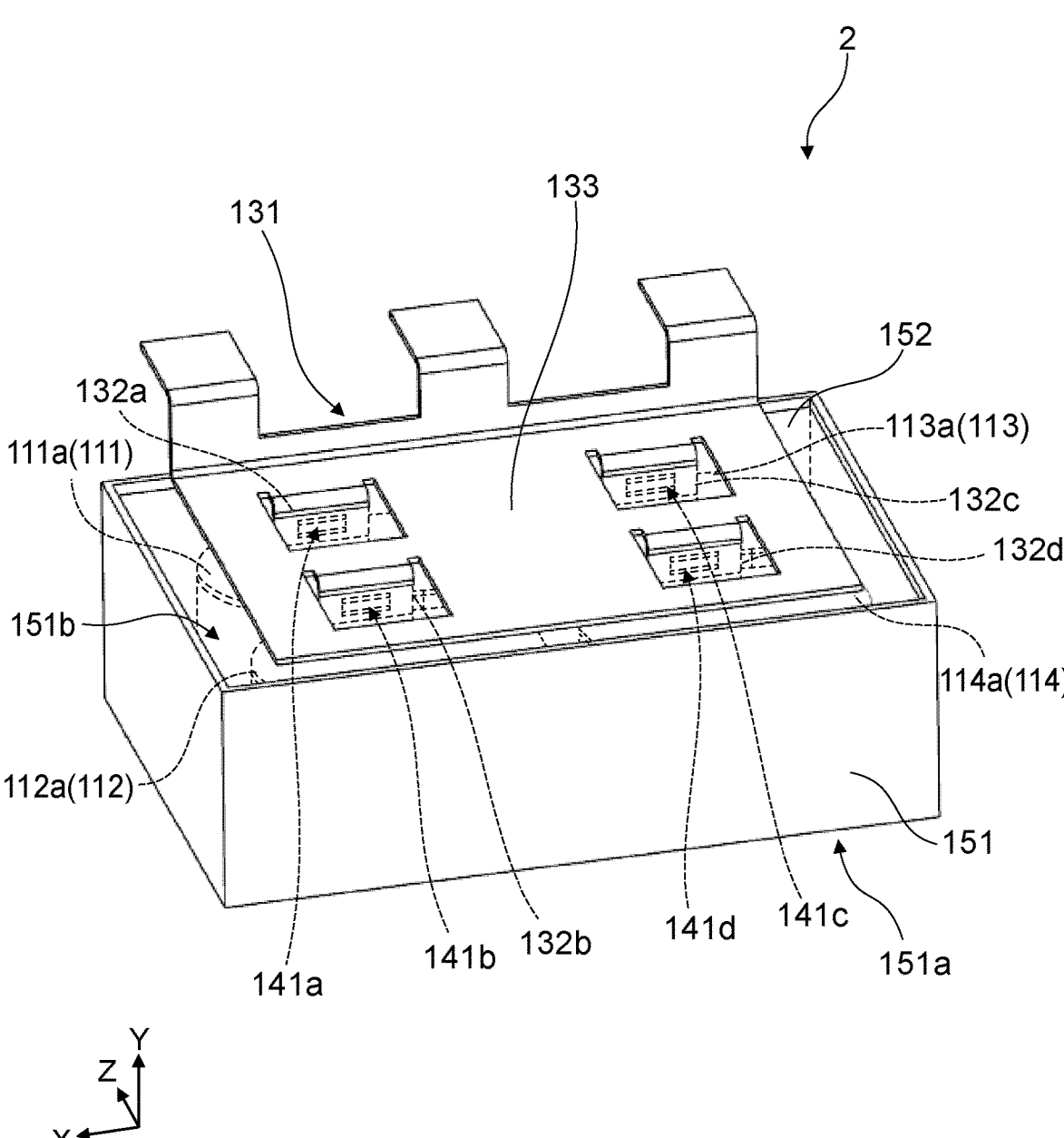
FIG. 7A is a perspective view of a capacitor module according to a second embodiment of the present invention.
Figure 7B:
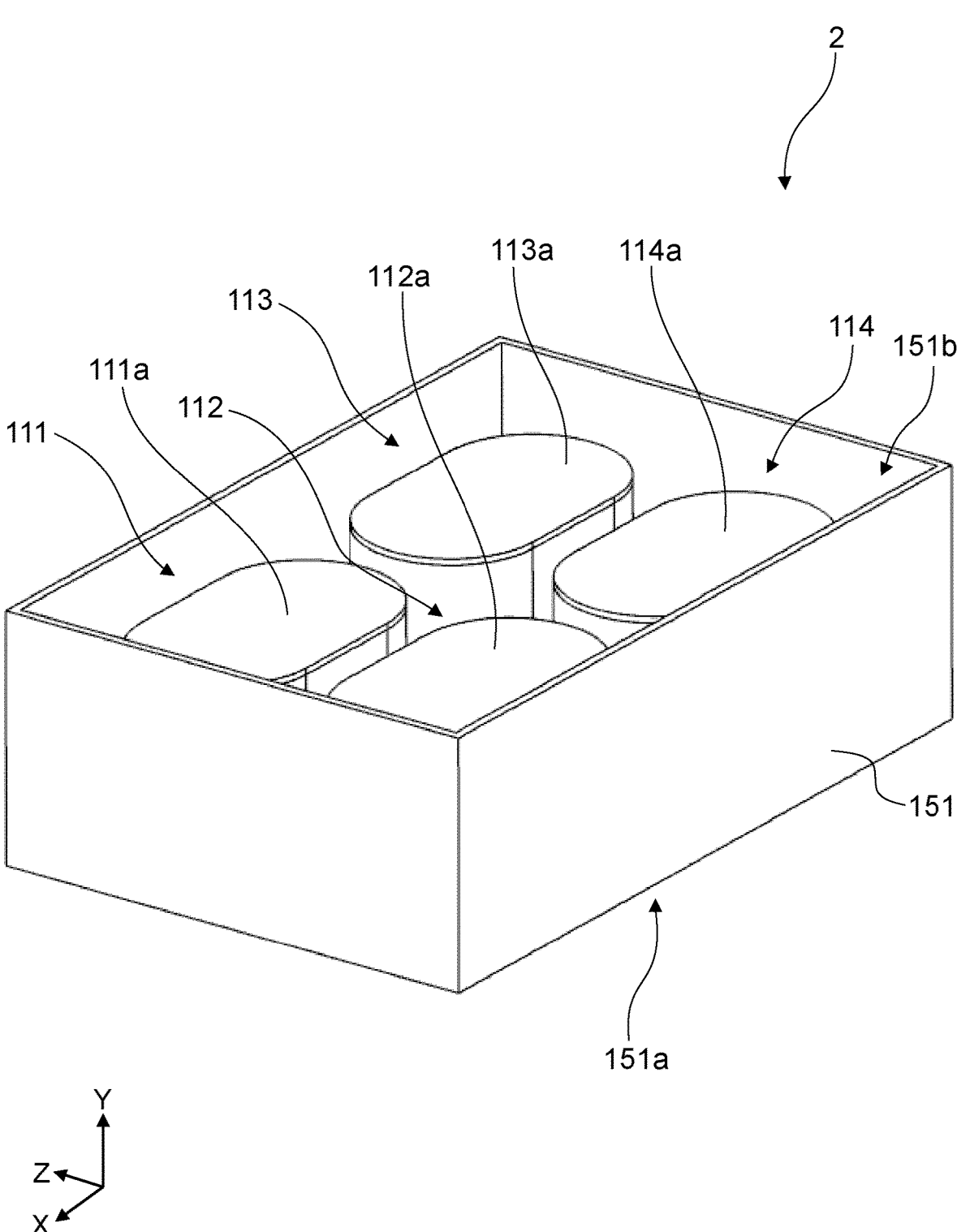
FIG. 7B is a perspective view showing arrangement of capacitors inside a case of the capacitor module in FIG. 7A.
Figure 8:
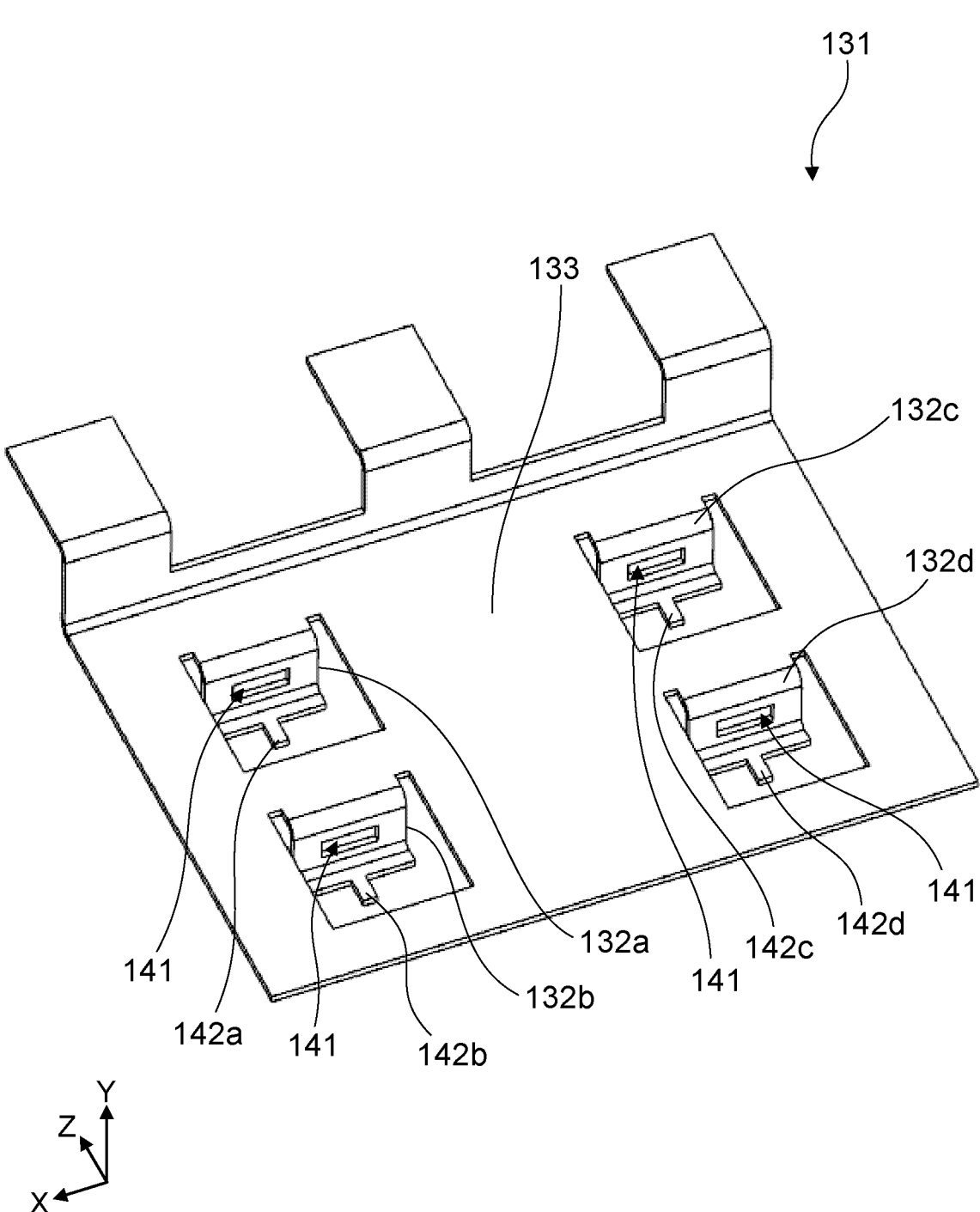
FIG. 8 is a perspective view showing a first bus bar of the capacitor module in FIG. 7A.

FIG. 7A is a perspective view of the capacitor module 2 according to the second embodiment of the present invention. FIG. 7B is a perspective view showing arrangement of capacitors 111 to 114 inside a case 151 of the capacitor module 2 in FIG. 7A. FIG. 8 is a perspective view showing a first bus bar 131 of the capacitor module 2 in FIG. 7A.

As shown in FIG. 7A, the second embodiment is different from the first embodiment in that the first bus bar 131 is integrally formed. In addition, the direction in which the capacitors 111 to 114 are disposed is different from that in the first embodiment.

As shown in FIG. 7B, in the present embodiment, four capacitors 111 to 114 are disposed in a case 151 in which an opening 151b is formed at a bottom surface 151a and a position opposed to the bottom surface 151a. Each of the capacitors 111 to 114 is disposed such that first electrodes 111a to 114a are directed to the opening 151b.

As shown in FIG. 7A, the first bus bar 131 is in contact with each of first electrodes 111a to 114a. Electrodes (not shown) on the opposite side of the capacitors 111 to 114 are each in contact with a second bus bar (not shown).

As shown in FIG. 8, the first bus bar 131 includes four contact portions 142a to 142d, four buried portions 132a to 132d, and an exposed portion 133. The contact portions 142a to 142d are in contact with the first electrodes 111a to 114a, respectively. The Buried portions 132a to 132d extend from the contact portions 142a to 142d and are disposed inside a sealing resin 152. The exposed portion 133 extends from the buried portions 132a to 132d and is disposed outside the sealing resin 152. The buried portions 132a to 132d are respectively provided with through holes 141a to 141d filled with the sealing resin 152.

In the present embodiment, the first bus bar 131 can be formed by press working, for example. Since the first electrodes 111a to 114a of the capacitors 111 to 114 are disposed toward the opening 51b of the case 151, it is possible to connect the first bus bar 131 with the first electrodes 111a to 114a by direct soldering or welding.

In the present embodiment, one of the contact portions 142a to 142d is provided for each of the capacitors 111 to 114, and through holes 141a to 141d are formed in the respective contact portions 142a to 142d.

Although not shown in FIG. 7A, the buried portion and the contact portion of the second bus bar connected to the second electrode (not illustrated) of each capacitors 111 to 114 are disposed along the bottom surface 151a of the case 151. When the second bus bar is disposed in this manner, the movement of the second bus bar in the case 151 is suppressed by the capacitors 111 to 114 and the sealing resin 152 in the case 151. Therefore, in the present embodiment, no through hole or protrusion is formed in the second bus bar.

Effects

According to the capacitor module 2 according to the second embodiment, it is possible to achieve the following effects similar to those in the first embodiment.

In the capacitor module 2, at least one through hole 141 is provided for each of the capacitors 111 to 114.

With such a configuration, it is possible to contribute to size reduction of the capacitor module 2 and to realize low ESR.

Third Embodiment

A capacitor module 3 according to a third embodiment of the present invention will be described.

In the third embodiment, points different from the second embodiment will be mainly described. In the third embodiment, the same or equivalent components as those of the second embodiment will be described with the same reference signs. In the third embodiment, the description overlapping with the second embodiment will be omitted.

Figure 9:
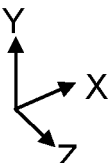
FIG. 9 is a perspective view showing a capacitor module according to a third embodiment of the present invention.
Figure 10:
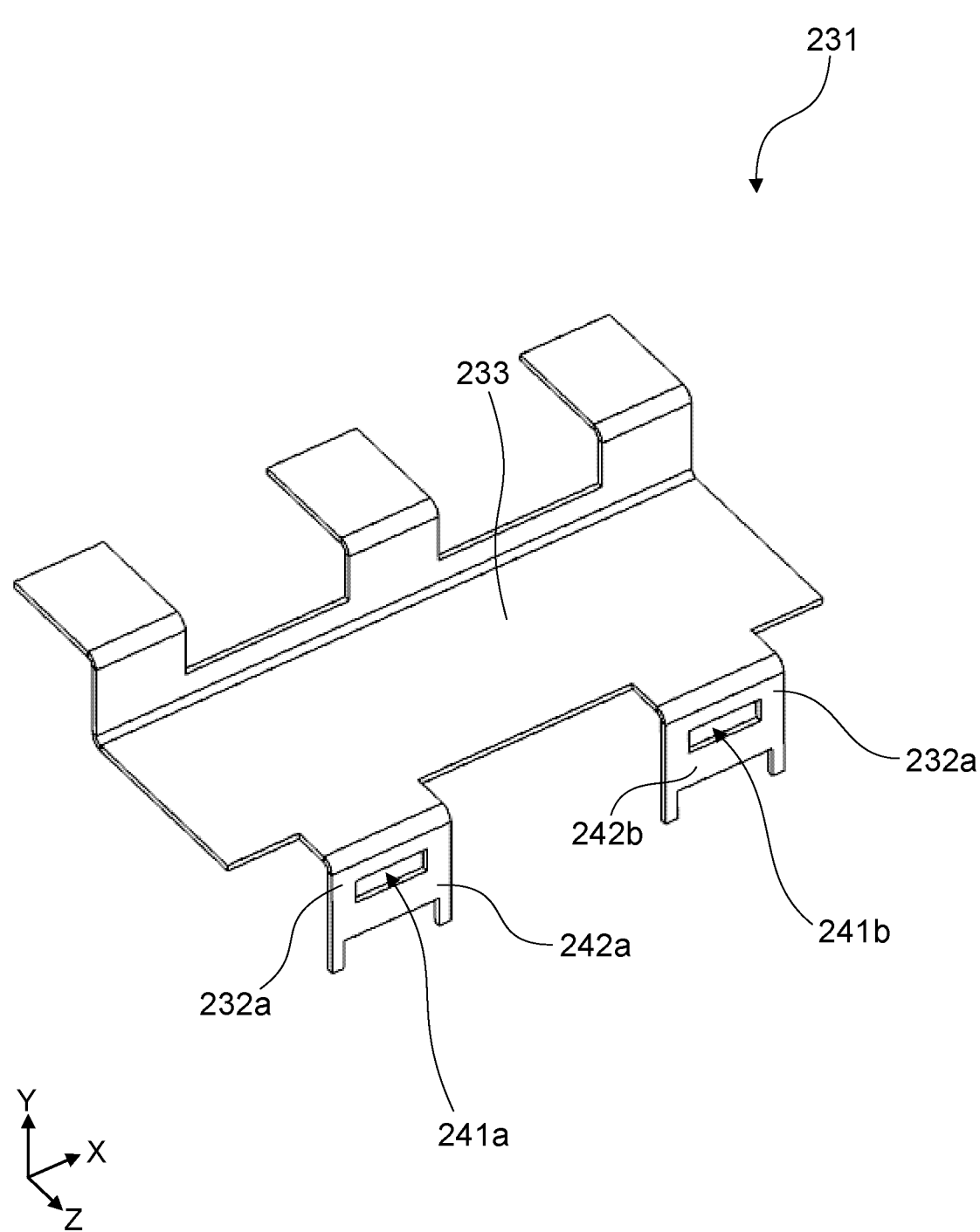
FIG. 10 is a perspective view showing a first bus bar of the capacitor module in FIG. 9.
Figure 11:
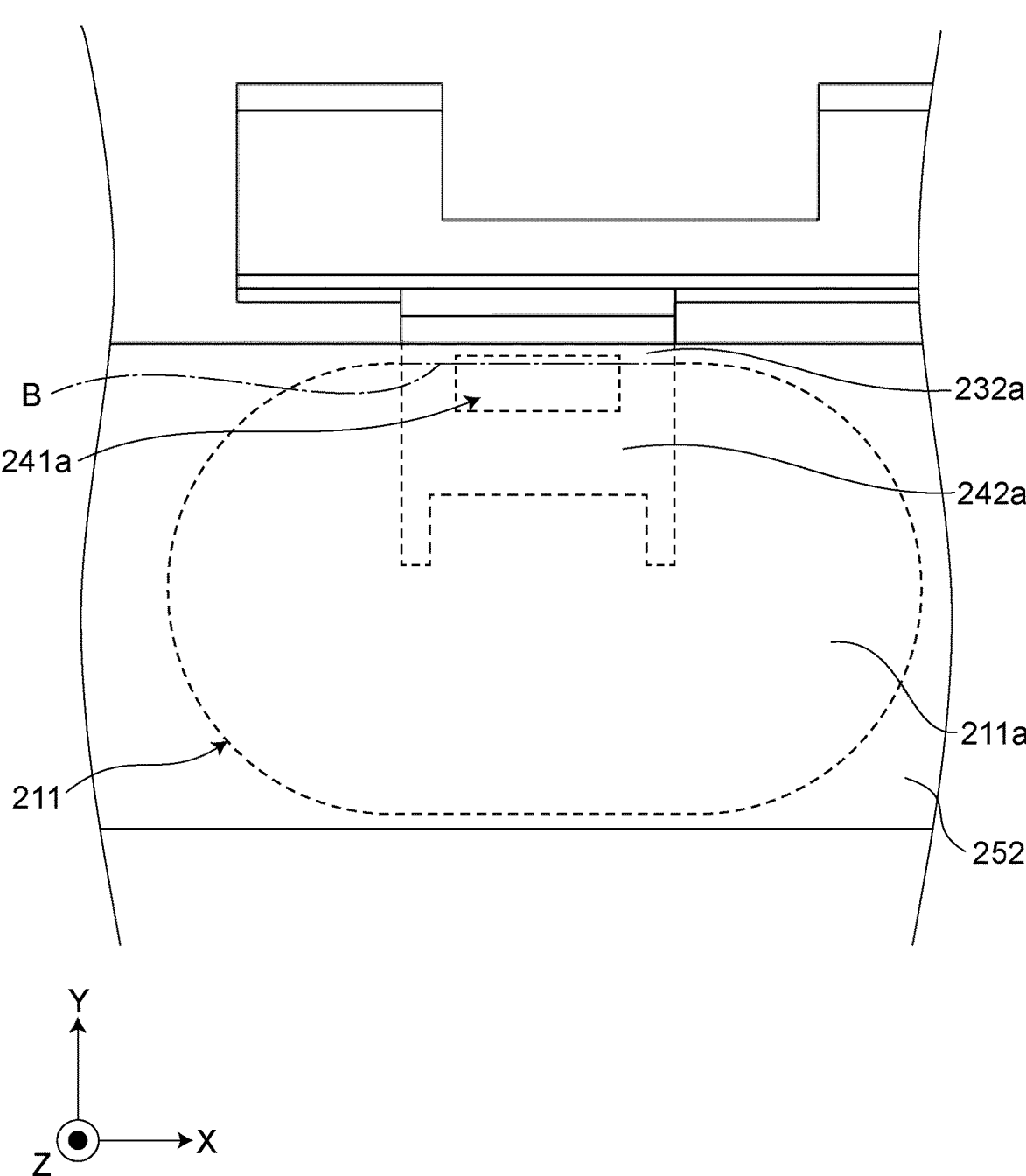
FIG. 11 is a cross-sectional view showing a part of the capacitor module in FIG. 9.

FIG. 9 is a perspective view showing the capacitor module 3 according to the third embodiment of the present invention. FIG. 10 is a perspective view showing a first bus bar 231 of the capacitor module 3 in FIG. 9. FIG. 11 is a cross-sectional view showing a part of the capacitor module 3 in FIG. 9.

As shown in FIG. 9, the third embodiment differs from the second embodiment in view of the direction in which capacitors 211 and 212 are disposed and the configuration of a first bus bar 231 according to the direction of capacitors 211 and 212.

In the present embodiment, as shown in FIG. 10, the first bus bar 231 includes contact portions 242a to 242b, buried portions 232a to 232b, and an exposed portion 233. The contact portions 242a to 242b and the buried portions 232a to 232b are formed by bending the end portion of the exposed portion 233.

As shown in FIG. 11, the contact portion 242a is in contact with the first electrode 211a of the capacitor 211, and the buried portion 232a extends from the contact portion 242a. In the contact portion 242a and the buried portion 232a, a boundary between the contact portion 242a and the buried portion 232a is indicated by a one-dot chain line B. In the present embodiment, a through hole 241a is formed across the contact portion 242a and the buried portion 232a. The through hole 241a may be formed across the contact portion 242a and the buried portion 232b as in the present embodiment, or may be formed in any one of the contact portion 242a and the buried portion 232a. The contact portion 242b and the buried portion 232b have the similar configuration.

Effects

According to the capacitor module 3 according to the third embodiment, it is possible to achieve the following effects similar to those in the first and second embodiments.

Although the present invention has been fully described in connection with preferred embodiments with reference to the accompanying drawings, various changes and modification will be apparent to those skilled in the art. Such changes and modifications are to be understood as being included within the scope of the present invention as set forth in the appended claims.

The present invention is useful for a capacitor module used for various electronic devices, electric devices, industrial devices, vehicle devices, and the like.

EXPLANATION OF REFERENCES 1 to 3 capacitor module
11 to 18, 111 to 114, 211 to 212 capacitor
11a to 18a, 111a to 114a, 211a to 212a first electrode
11b to 18b second electrode
31, 131, 231 first bus bar
33, 132, 232 buried portion
41, 141, 241 through hole
34, 133, 233 exposed portion
35, 142, 242 contact portion
41a first protrusion
41b, 41c second protrusion
36, 36a second bus bar
38, 38a buried portion
39 exposed portion
40 contact portion
46 through hole
51, 151, 251 case
51a, 151a, 251a bottom surface
51b, 151b, 251b opening
52, 152, 252 sealing resin
The invention claimed is:
1. A capacitor module comprising:
a case defining an interior space and having an opening at a position opposed to a bottom surface thereof;
a sealing resin in the interior space of the case;
one or more capacitors in the sealing resin in the interior space of the case, each of the one or more capacitors having a first electrode and a second electrode;
a first bus bar having a first contact portion that is in contact with the first electrode of the one or more capacitors, a first buried portion in the sealing resin and extending from the first contact portion, and a first exposed portion that extends from the first buried portion outside the sealing resin; and
a second bus bar having a second contact portion that is in contact with the second electrode of the one or more capacitors, a second buried portion in the sealing resin and extending from the second contact portion, and a second exposed portion that extends from the second buried portion outside the sealing resin,
wherein at least one of the first contact portion, the second contact portion, the first buried portion, and the second buried portion define one or more through holes that are completely filled with the sealing resin or include one or more protrusions having a periphery completely surrounded by the sealing resin,
wherein the at least one of the first contact portion, the second contact portion, the first buried portion, and the second buried portion including the one or more through holes or the one or more protrusions extends in a direction from the bottom surface of the case toward the opening,
wherein the one or more through holes or the one or more protrusions extend in a direction parallel to the opening of the case, and
wherein at least one of the first exposed portion and the second exposed portion extends in the direction parallel to the opening of the case, and extends over the one or more capacitor elements with the sealing resin therebetween.
2. The capacitor module according to claim 1, wherein the at least one of the first contact portion, the second contact portion, the first buried portion, and the second buried portion include the one or more through holes.
3. The capacitor module according to claim 1, wherein the at least one of the first contact portion, the second contact portion, the first buried portion, and the second buried portion include the one or more protrusions.
4. The capacitor module according to claim 3, wherein a first protrusion of the one or more protrusions is a bent end portion of the at least one of the first contact portion, the second contact portion, the first buried portion, and the second buried portion.
5. The capacitor module according to claim 4, wherein the one or more protrusions includes a second protrusion extending in a width direction from the at least one of the first contact portion, the second contact portion, the first buried portion, and the second buried portion.
6. The capacitor module according to claim 1, wherein the at least one of the first contact portion, the second contact portion, the first buried portion, and the second buried portion includes at least one of the through holes or the protrusions for each of the one or more capacitors.
7. The capacitor module according to claim 1, wherein the first buried portion and the second buried portion each include a through hole of the one or more through holes.
8. The capacitor module according to claim 1, wherein the first buried portion includes the one or more through holes.
9. The capacitor module according to claim 1, wherein the first contact portion and the second contact portion each include a through hole of the one or more through holes.
10. The capacitor module according to claim 1, wherein the first buried portion and the second buried portion each include a protrusion of the one or more protrusions.
11. The capacitor module according to claim 10, wherein a first protrusion of the one or more protrusions is a bent end portion of the first buried portion, and a second protrusion of the one or more protrusions is a bent end portion of the second buried portion.

12. The capacitor module according to claim 11, wherein the one or more protrusions includes a third protrusion extending in a width direction from the first buried portion, and a fourth protrusion extending in a width direction from the second buried portion.

\* \* \* \* \*